US011370472B2

(12) United States Patent
Brown et al.

(10) Patent No.: US 11,370,472 B2
(45) Date of Patent: Jun. 28, 2022

(54) STEERING COLUMN TILT LOCK

(71) Applicant: Mahindra N.A. Tech Center, Auburn Hills, MI (US)

(72) Inventors: Matthew T. Brown, South Lyon, MI (US); Huibert Mees, Troy, MI (US); Marcel Kubisz, Macomb Township, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 0 days.

(21) Appl. No.: 17/114,557

(22) Filed: Dec. 8, 2020

(65) Prior Publication Data

US 2021/0179162 A1 Jun. 17, 2021

Related U.S. Application Data

(60) Provisional application No. 62/947,018, filed on Dec. 12, 2019.

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ........ B62D 1/184; B62D 1/187; B62D 1/189; B62D 1/19; B62D 1/192; B62D 1/195
See application file for complete search history.

(56) References Cited

U.S. PATENT DOCUMENTS

| 4,527,444 A | * | 7/1985 | McKee | B62D 1/105 |
| | | | | 180/90 |
| 4,538,478 A | * | 9/1985 | Sato | B62D 1/183 |
| | | | | 280/775 |
| 4,649,769 A | | 3/1987 | Venable | |
| 4,656,887 A | * | 4/1987 | Yoshida | B62D 1/184 |
| | | | | 74/493 |
| 4,793,204 A | * | 12/1988 | Kubasiak | B62D 1/184 |
| | | | | 280/775 |

(Continued)

FOREIGN PATENT DOCUMENTS

| AU | 8825582 A | 2/1984 |
| DE | 4016163 A1 | 11/1991 |
| WO | WO-2019147033 A1 | 8/2019 |

OTHER PUBLICATIONS

Office Action regarding Indian Patent Application No. 202024054082, dated Aug. 23, 2021.

*Primary Examiner* — Laura Freedman
(74) *Attorney, Agent, or Firm* — Harness, Dickey & Pierce, P.L.C.

(57) ABSTRACT

A steering column assembly includes a steering column housing, a tilt housing pivotally attached to the steering column, and a steering wheel shaft supported by the tilt housing. The tilt housing is moveable between a range of angular positions relative to the steering column housing. A tilt lever assembly, including a tilt lever that is moveable between a locked position and an unlocked position, mechanically actuates a tilt lock mechanism between an engaged condition and a disengaged condition. The tilt lever assembly has a tilt lever assembly center of mass that is positioned such that an inertial force acting in a forward direction on the tilt lever assembly center of mass urges the tilt lever towards the locked position.

19 Claims, 8 Drawing Sheets

(56) References Cited

U.S. PATENT DOCUMENTS

| | | | | |
|---|---|---|---|---|
| 4,938,093 | A * | 7/1990 | Matsumoto | B62D 1/183 74/493 |
| 5,085,466 | A * | 2/1992 | Nakatsuka | B60R 21/2032 280/731 |
| 5,524,927 | A * | 6/1996 | Toussaint | B62D 1/184 280/775 |
| 5,823,062 | A * | 10/1998 | Snell | B62D 1/184 74/493 |
| 6,036,228 | A * | 3/2000 | Olgren | B62D 1/184 280/775 |
| 6,272,945 | B1 * | 8/2001 | Jolley | B62D 1/184 280/775 |
| 6,986,531 | B2 * | 1/2006 | Ohtsu | B62D 1/184 280/775 |
| 7,090,250 | B2 | 8/2006 | Kinoshita et al. | |
| 7,475,614 | B2 * | 1/2009 | Cymbal | B62D 1/184 280/775 |
| 7,779,717 | B2 * | 8/2010 | Ozsoylu | B62D 1/184 74/493 |
| 8,359,945 | B2 * | 1/2013 | Tanke | B62D 1/184 74/493 |
| 8,413,541 | B2 * | 4/2013 | Davies | B62D 1/184 74/493 |
| 8,505,408 | B2 * | 8/2013 | Havlicek | B62D 1/195 74/493 |
| 2008/0141815 | A1 * | 6/2008 | Ridgway | B62D 1/187 74/493 |
| 2009/0019963 | A1 * | 1/2009 | Hubrecht | B62D 1/184 74/493 |

* cited by examiner

STEERING COLUMN TILT LOCK

CROSS REFERENCE TO RELATED APPLICATION

This application claims the benefit of provisional application Ser. No. 62/947,018 filed Dec. 12, 2019. The entire disclosure of the application referenced above is incorporated herein by reference.

FIELD

The present disclosure relates to steering assemblies for vehicles and more particularly to steering column assemblies and tilt mechanisms.

BACKGROUND

This section provides background information related to the present disclosure and is not necessarily prior art.

Steering assemblies are commonly used in vehicles, such as trucks and automobiles, to turn the wheel(s) of the vehicle for steering purposes. A steering wheel, mounted to a steering wheel shaft, is typically included at one end of such steering wheel assemblies. Together, the steering wheel, steering wheel shaft, and other components make up what can be referred to as a steering column assembly. At least part of this steering column assembly typically protrudes into the passenger compartment of the vehicle. A steering mechanism, such as a rack and pinion assembly, is placed at the other end of the steering assembly and is typically connected to the wheel(s) by one or more tie rods. The steering mechanism is configured to translate rotational movement of the steering wheel and the steering wheel shaft into linear movement that is used to turn the direction the wheel(s) are pointed relative to the vehicle. One or more intermediate shafts may be used to connect the steering wheel shaft to the steering mechanism.

In order to accommodate drivers of different sizes and different seating positions within the vehicle, many modern steering assemblies include tilt mechanisms that allow the steering wheel and steering wheel shaft to tilt or pivot up and down to provide a degree of angular adjustment. Many of these tilt mechanisms include a lever that is used to lock and unlock the tilt mechanism. When the lever is moved to unlock the tilt mechanism, the angular position of the steering wheel can be adjusted. The lever is then moved in the opposite direction to lock the tilt mechanism in place once a desirable angular position is selected to prevent the steering wheel from tilting or pivot when the vehicle is being driven.

SUMMARY

This section provides a general summary of the disclosure, and is not a comprehensive disclosure of its full scope or all of its features.

In accordance with one aspect of the present disclosure, an improved steering column assembly is provided that includes a steering column housing, a tilt housing pivotally attached to the steering column, and a steering wheel shaft supported by said tilt housing. The tilt housing is pivotally attached to the steering column housing at a tilt housing pivot such that the tilt housing is moveable between a range of angular positions relative to the steering column housing. The steering wheel shaft extends in a forward direction toward the steering column housing along a steering wheel shaft axis. The steering wheel shaft is free to rotate co-axially about the steering wheel shaft axis relative to the tilt housing.

The steering column assembly includes a tilt lock mechanism and a tilt lever assembly that is mechanically coupled to the tilt lock mechanism such that the tilt lever assembly mechanically actuates the tilt lock mechanism back and forth between an engaged condition and a disengaged condition. The tilt lock mechanism is configured to prevent the tilt housing from pivoting relative to the steering column housing in the engaged condition, but is configured to permit the tilt housing to pivot relative to the steering column housing over the range of angular positions in the disengaged condition. The tilt lever assembly includes a tilt lever that is moveable between a locked position and an unlocked position. The tilt lever assembly mechanically actuates the tilt lock mechanism to place the tilt lock mechanism in the engaged condition when the tilt lever is in the locked position and mechanically actuates the tilt lock mechanism to place the tilt lock mechanism in the disengaged condition when the tilt lever is in the unlocked position.

The tilt lever assembly has a tilt lever assembly center of mass that is positioned such that an inertial force acting in the forward direction on the tilt lever assembly center of mass urges the tilt lever towards the locked position. The advantage of such a design is that during a front-end impact (i.e., a crash of the vehicle), inertial forces acting on the tilt lever assembly helps to hold the tilt lever in the locked position, which keeps the tilt lock mechanism in the engaged condition throughout the crash for an improved factor of safety. This functionality is achieved because during a front-end impact the inertia of the tilt lever places a force on the tilt lever assembly center of mass that acts in the forward direction. Because of the way the mass of the tilt lever assembly is distributed, the inertial force acting in the forward direction on the tilt lever assembly center of mass pushes the tilt lever towards the locked position and holds it there throughout the vehicle crash.

In accordance with another aspect of the present disclosure, the tilt lock mechanism includes a tilt lock lever that is mounted on a tilt lock lever pivot. As such, the tilt lock lever is permitted to rotate about a tilt lock lever pivot axis between an engaged position and a disengaged position. The tilt lock lever pivot is co-axially aligned with the tilt lock lever pivot. The tilt lock mechanism also includes a ratchet on the steering column housing and a pawl that is pivotally mounted to the tilt housing and positioned to selectively engage the ratchet. The tilt lock lever is arranged to contact and hold the pawl in engagement with the ratchet in the engaged position to prevent the tilt housing from pivoting relative to the steering column housing and move away from the pawl in the disengaged position to permit the tilt housing to pivot relative to the steering column housing over the range of angular positions. The tilt lock mechanism further includes a tilt lock lever counterweight that is rotatably coupled to the tilt lock lever such that the tilt lock lever counterweight rotates with the tilt lock lever about the tilt lock lever pivot axis. The tilt lock lever counterweight provides a tilt lock mechanism center of mass at a position where the inertial force acting in the forward direction on the tilt lock mechanism center of mass urges the tilt lock lever towards the engaged position.

In accordance with another aspect of the present disclosure, the tilt lever assembly is mechanically coupled to the tilt lock lever by a push-pull cable such that the tilt lock lever is placed in the engaged position when the tilt lever is in the locked position and the tilt lock lever is placed in the disengaged position when the tilt lever is in the unlocked position. The tilt lever assembly also includes a pulley that rotates with the tilt lever about the tilt lever pivot axis. The push-pull cable is wound about at least a portion of the pulley and is arranged such that movement of the tilt lever in the forward direction causes the push-pull cable to push the tilt lock lever to the engaged position.

Again, the advantage provided by these designs is that during a front-end impact (i.e., a crash of the vehicle), inertial forces acting on the tilt lever assembly and/or the tilt lock mechanism helps to hold the tilt lever in the locked position and the tilt lock mechanism in the engaged condition throughout the crash for an improved factor of safety. This functionality is achieved because during a front-end impact, inertial forces acting in the forward direction on the tilt lever assembly center of mass and the tilt lock lever assembly center of mass push/hold the tilt lever in the locked position and the tilt lock lever in the engaged position to prevent the tilt housing from pivoting relative to the steering column housing during the crash.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, a steering assembly 20 with two different steering column assemblies 22, 22' is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
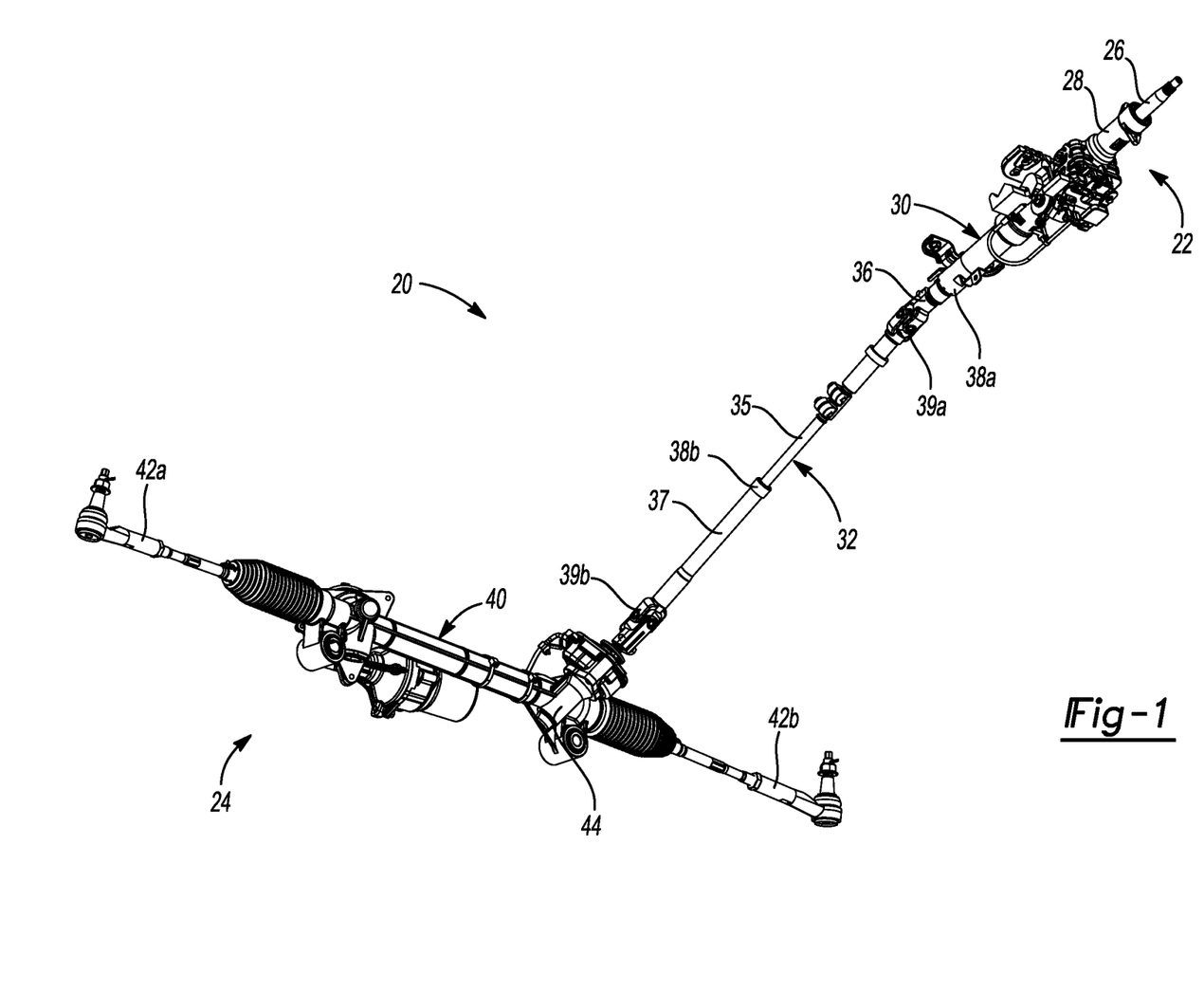
FIG. 1 is a side perspective view of an exemplary steering assembly for a vehicle that is constructed in accordance with the present disclosure.

With reference to FIG. 1, an exemplary steering assembly 20 for a vehicle (not shown) is illustrated. A steering column assembly 22 is located at one end of the steering assembly 20 and a steering mechanism 24 is located at the other end of the steering assembly 20. The steering column assembly 22 includes a steering wheel shaft 26, a tilt housing 28, and a steering column housing 30. A steering wheel (not shown) mounts to the steering wheel shaft 26, which is free to rotate relative to the tilt housing 28. An intermediate shaft assembly 32, made up of multiple intermediate shafts 35, 36, 37, extends between the steering column assembly 22 and the steering mechanism 24. The intermediate shaft assembly 32 is rotatably coupled to the steering wheel shaft 26 while splined connections 38a, 38b and/or U-joints 39a, 39b connect the multiple intermediate shafts 35, 36, 37 together to form one rotating assembly. Although other types of steering mechanisms 24 may be used, in the illustrated example, the steering mechanism 24 includes a pinion gear (not shown), a rack assembly 40, and a pair of tie rods 42a, 42b that connect the rack assembly 40 to a pair of wheels (not shown). The pinion gear is rotatably coupled to the intermediate shaft assembly 32 and rotates within a pinion housing 44. The pinion gear is disposed in meshing engagement with teeth (not shown) of the rack assembly 40 and operates to translate rotational movement of the steering wheel shaft 26 into linear movement of the rack assembly 40, which is used to turn the direction the wheels are pointed relative to the vehicle.

Figure 2:
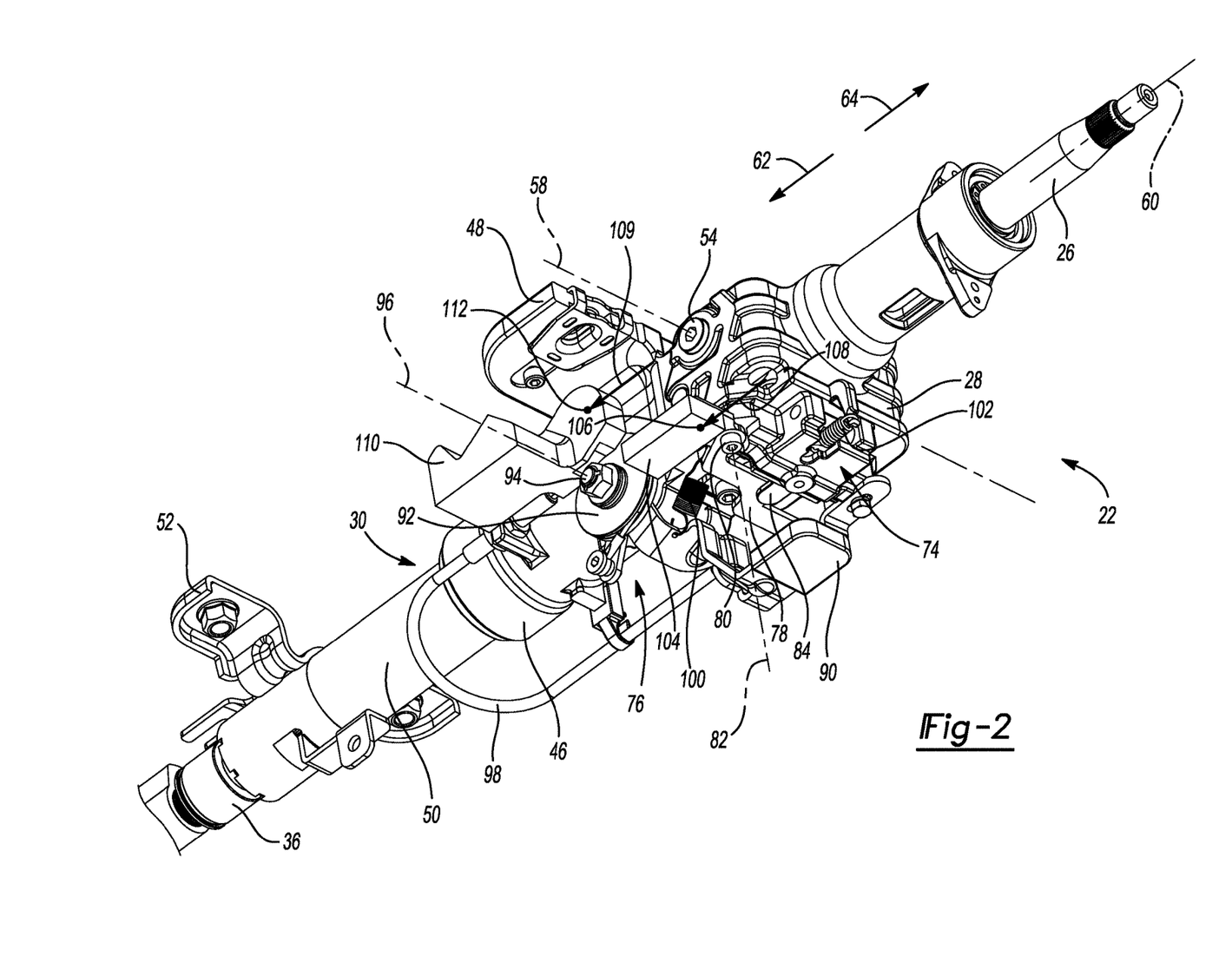
FIG. 2 is a side perspective view of an exemplary steering column assembly, which is a component of the steering assembly shown in FIG. 1.
Figure 3:
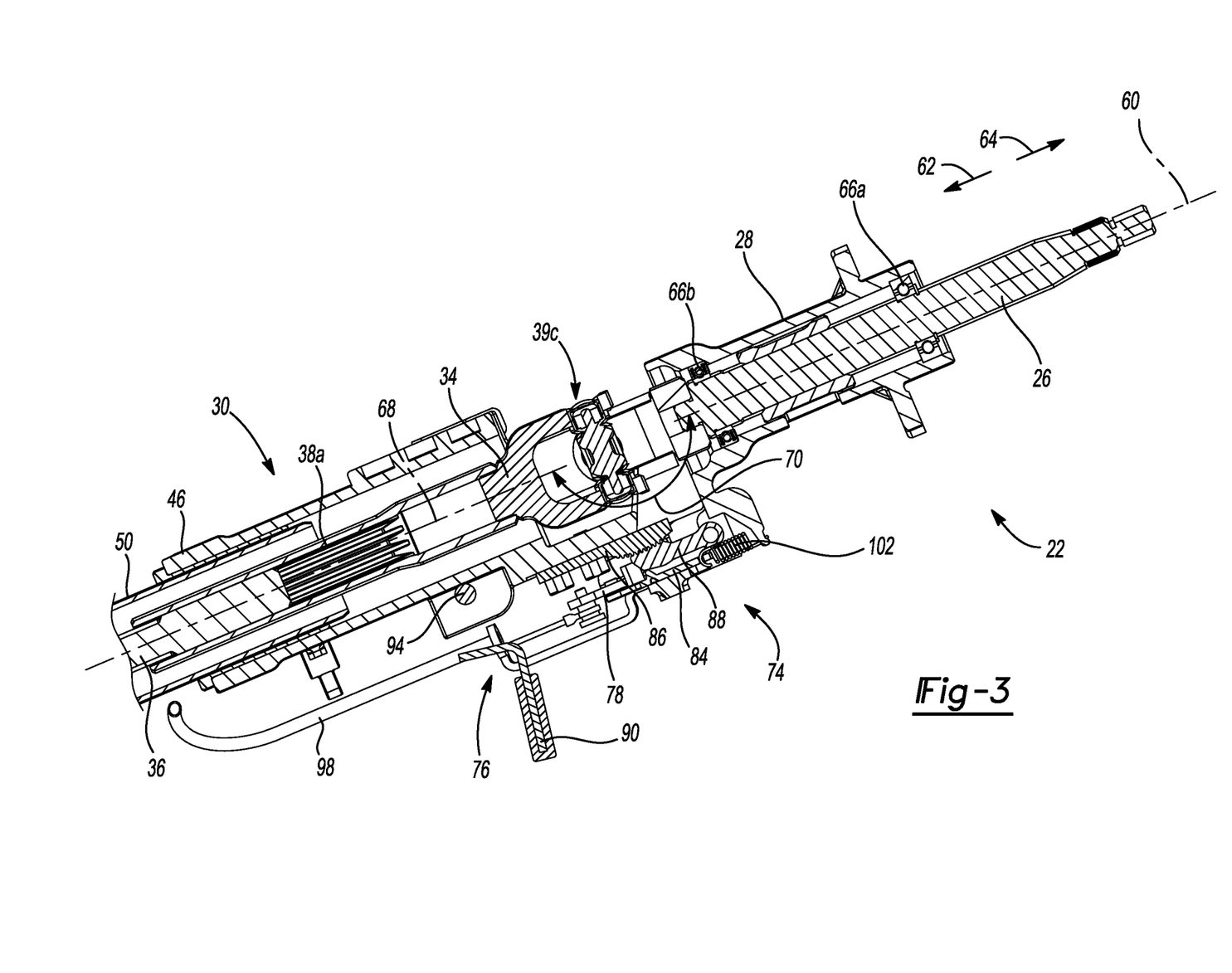
FIG. 3 is a side cross-section view of the exemplary steering column assembly shown in FIG. 2, which includes a tilt lever assembly and a tilt lock mechanism.

With additional reference to FIGS. 2 and 3, the steering column housing 30 includes a first steering column housing segment 46 with a first mounting flange 48 and a second steering column housing segment 50 with a second mounting flange 52. A portion of the second steering column housing segment 50 is received inside the first steering column segment in a telescoping arrangement such that the first and second steering column segments 46, 50 can move relative to one another during a vehicle crash, such as during a front-end impact, which allows the steering column housing 30 to collapse/compress during the crash. The first and second mounting flanges 48, 52 are configured to be fixedly attached to the vehicle. For example, the mounting flanges 48, 52 may be bolted to the vehicle's frame structure at the front of the passenger compartment or dash panel. The tilt housing 28 is pivotally attached to the first steering column housing segment 46 at a tilt housing pivot 54 such that the tilt housing 28 is permitted to rotate/pivot between a range of angular positions 56 relative to the steering column housing 30 about a tilt housing pivot axis 58 that is co-axially aligned with the tilt housing pivot 54. By allowing the steering wheel shaft 26 (and thus the steering wheel) to tilt or pivot up and down, a degree of angular adjustment is provided in order to accommodate drivers of different sizes and different seating positions within the vehicle.

The steering wheel shaft 26 extends along a steering wheel shaft axis 60 in a forward direction 62 toward the steering column housing 30 and in a rearward direction 64 away from the steering column housing 30. The steering wheel shaft 26 is supported in the tilt housing 28 by bearing packs 66a, 66b and is therefore free to rotate co-axially about the steering wheel shaft axis 60 relative to the tilt housing 28. The steering wheel shaft 26 is arranged in the tilt housing 28 such that the steering wheel shaft axis 60 is transverse to the tilt housing pivot axis 58. A first intermediate shaft 34 extends along a first intermediate shaft axis 68 and is rotatably coupled to the steering wheel shaft 26 by a first coupling 39c, which is configured as a U-joint in the illustrated example, that allows the steering wheel shaft 26 to pivot relative to the first intermediate shaft 34 over the range of angular positions 56 the tilt housing 28 may assume during adjustment. As such, an angle 70 is defined between the steering wheel shaft axis 60 and the first intermediate shaft axis 68 that may be adjusted (i.e., changed) by tilting or pivoting the tilt housing 28 relative to the steering column housing 30. A second intermediate shaft 36 extends within the steering column housing 30 along the first intermediate shaft axis 68 and is rotatably coupled to the first intermediate shaft 34 by a first splined connection 38a that permits linear movement between the first and second intermediate shafts 34, 36. Both the first and second intermediate shafts 34, 36 are supported by and rotate within the steering column housing 30.

The steering column assembly 22 includes a tilt lock mechanism 74 and a tilt lever assembly 76 that mechanically actuates the tilt lock mechanism 74. The tilt lock mechanism 74 includes a tilt lock lever 78 that is pivotally attached to the tilt housing 28 at a tilt lock lever pivot 80 such that the tilt lock lever 78 is permitted to rotate about a tilt lock lever pivot axis 82 that is co-axially aligned with the tilt lock lever pivot 80. The tilt lock lever 78 includes a tilt lock slide 84 that slides along a linear track as the tilt lock lever 78 rotates about the tilt lock lever pivot 80. The tilt lock slide 84 is attached to the tilt lock lever 78 by a pin that is laterally spaced from the tilt lock lever pivot 80 such that rotation of the tilt lock lever 78 about the tilt lock lever pivot 80 results in linear movement of the tilt lock slide 84. The tilt lock mechanism 74 also includes a ratchet 86 that is fixed to the first steering column housing segment 46 and a pawl 88 that is pivotally mounted to the tilt housing 28 and positioned to selectively engage the ratchet 86. The ratchet 86 and the pawl 88 include opposing teeth that engage one another when the pawl 88 is brought into contact with the ratchet 86.

The tilt lever assembly 76 includes a tilt lever 90 and a pulley 92 that are either integrally formed or rotatably connected to one another and that are mounted on a tilt lever pivot 94. As such, both the tilt lever 90 and the pulley 92 are permitted to rotate about a tilt lever pivot axis 96 that is co-axially aligned with the tilt lever pivot 94. The tilt lever 90 is mechanically coupled to the tilt lock lever 78 by a push-pull cable 98. The push-pull cable 98 is wound about at least a portion of the pulley 92 in a clockwise direction when viewed from the cable attachment side of the steering column housing 30 as shown in FIGS. 2 and 3 (i.e., the push-pull cable 98 is wound over the pulley 92) and is therefore arranged such that movement of the tilt lever 90 about the tilt lever pivot axis 96 causes the push-pull cable 98 to move the tilt lock lever 78 about the tilt lock lever pivot axis 82. The tilt lever pivot axis 96 is spaced from and parallel to the tilt housing pivot axis 58 and is spaced from and transverse to the tilt lock lever pivot axis 82.

Figure 4:
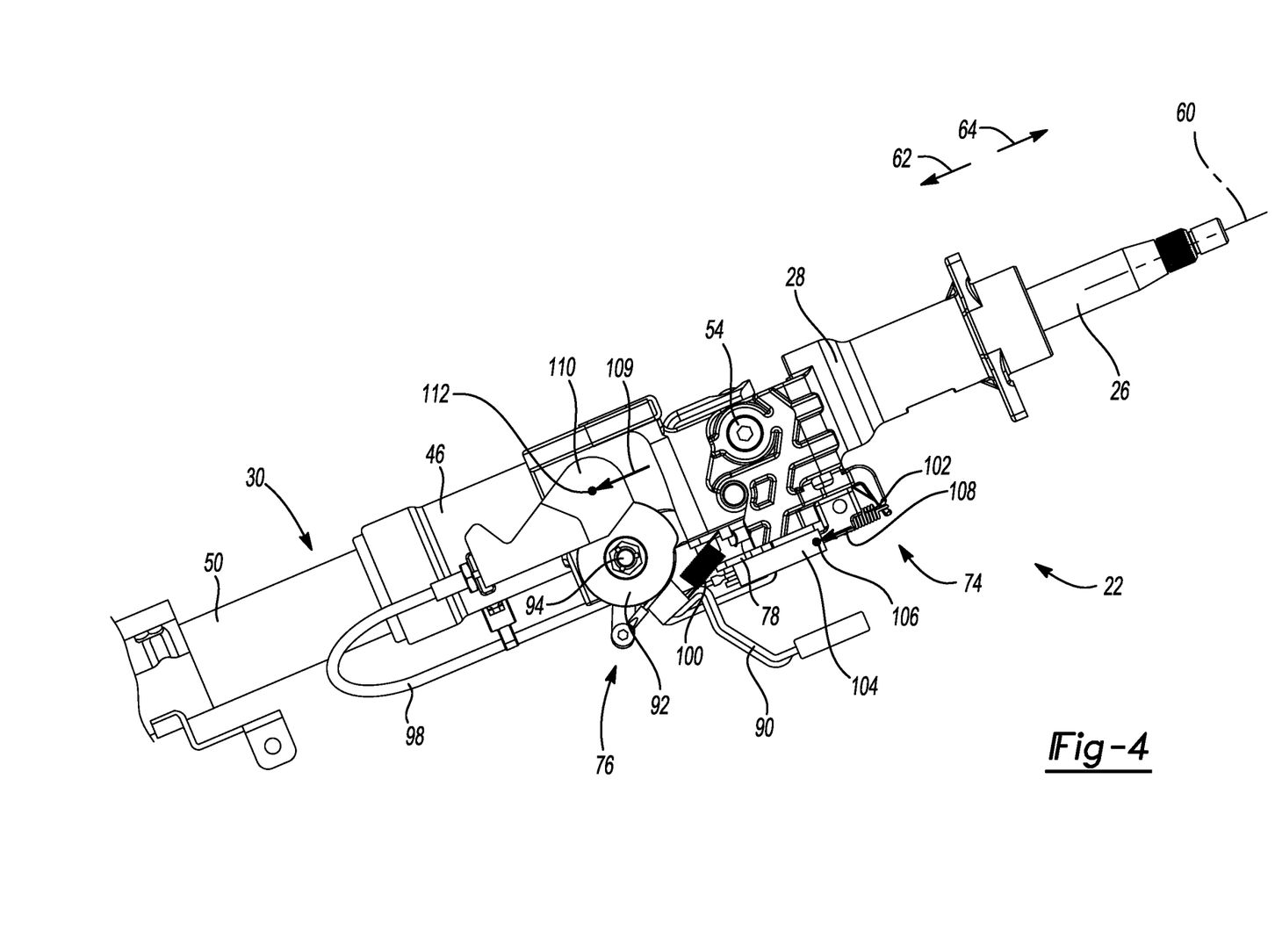
FIG. 4 is a side elevation view of the exemplary steering column assembly shown in FIG. 2 where the tilt lever assembly is shown in a locked position and the tilt lock mechanism is shown in an engaged position.
Figure 5:
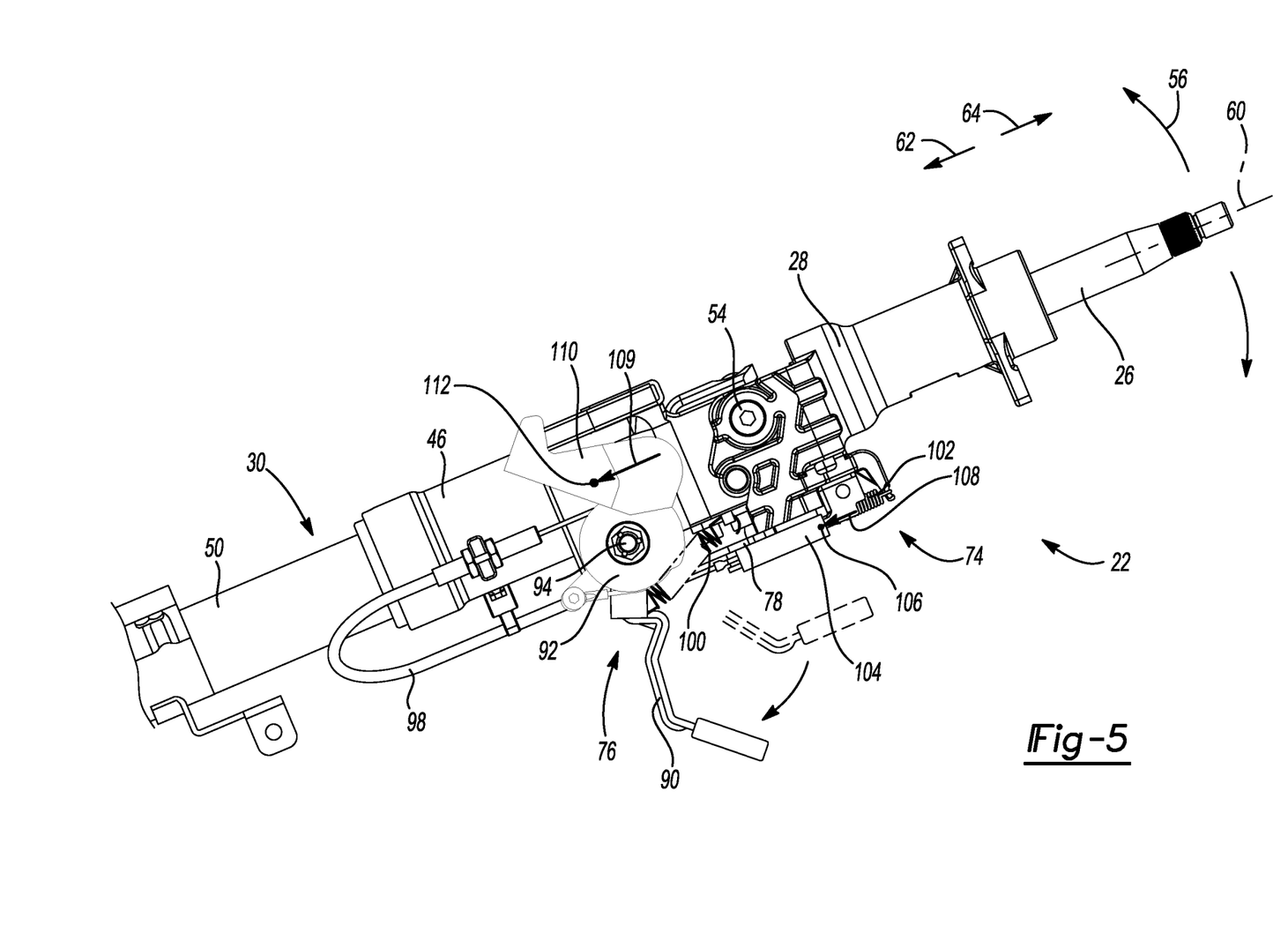
FIG. 5 is a side elevation view of the exemplary steering column assembly shown in FIG. 2 where the tilt lever assembly is shown in an unlocked position and the tilt lock mechanism is shown in a disengaged position.

With additional reference to FIGS. 4 and 5, the tilt lever 90 is moveable (i.e., rotates or pivots about the tilt lever pivot axis 96) between a locked position (FIG. 4) and an unlocked position (FIG. 5). The tilt lock lever 78 is moveable (i.e., rotates about the tilt lock lever pivot axis 82) between an engaged position (FIG. 4) and a disengaged position (FIG. 5). As previously explained, the tilt lever 90 is mechanically coupled to the tilt lock lever 78 by the push-pull cable 98 such that the tilt lock lever 78 is placed in the engaged position when the tilt lever 90 is in the locked position (FIG. 4) and the tilt lock lever 78 is placed in the disengaged position when the tilt lever 90 is in the unlocked position (FIG. 5).

As shown in FIG. 4, movement of the tilt lever 90 in the rearward direction 64 to the locked position moves the tilt lock lever 78 to the engaged position and places the tilt lock mechanism 74 in an engaged condition where the tilt lock lever 78 and/or tilt lock slide 84 move into contact with and hold the pawl 88 in engagement with the ratchet 86 preventing the tilt housing 28 from pivoting relative to the steering column housing 30. As shown in FIG. 5, movement of the tilt lever 90 in the forward direction 62 to the unlocked position moves the tilt lock lever 78 to the disengaged position and places the tilt lock mechanism 74 in a disengaged condition where the tilt lock lever 78 moves away from the pawl 88 releasing it so the tilt housing 28 is permitted to pivot relative to the steering column housing 30 and may be adjusted within the range of angular positions 56 permitted by the steering column assembly 22. The tilt lever 90 is then moved back in the opposite direction (i.e., the rearward direction 64) to lock the tilt lock mechanism 74 in place once a desirable angular position 56 is selected to prevent the steering wheel from tilting or pivoting when the vehicle is being driven.

Optionally, a tilt lever biasing member 100 may be placed between and connected to the steering column housing 30 and the tilt lever 90 to bias the tilt lever 90 in the rearward direction 64 toward the locked position. Alternatively or in addition to the tilt lever biasing member 100, the steering column assembly 22 may include a tilt lock biasing member 102 placed between and connected to the tilt housing 28 and the tilt lock slide 84 that biases the tilt lock slide 84 and therefore the tilt lock lever 78 in the rearward direction 64 toward the engaged position.

With reference to FIGS. 2-5, the tilt lock mechanism 74 includes a tilt lock lever counterweight 104 that is rotatably coupled to the tilt lock lever 78 such that the tilt lock lever counterweight 104 rotates with the tilt lock lever 78 about the tilt lock lever pivot axis 82. The tilt lock mechanism 74 has a tilt lock mechanism center of mass 106 and the tilt lock lever counterweight 104 places the tilt lock mechanism center of mass 106 at a position where an inertial force 108 acting in the forward direction 62 on the tilt lock mechanism center of mass 106 urges the tilt lock lever 78 towards the engaged position. The tilt lever assembly 76 includes a tilt lever counterweight 110 that is rotatably coupled to the tilt lever 90 such that the tilt lever counterweight 110 rotates with the tilt lever 90 about the tilt lever pivot axis 96. The tilt lever assembly 76 has a tilt lever assembly center of mass 112 and the tilt lever counterweight 110 places the tilt lever assembly center of mass 112 at a position where an inertial force 109 acting in the forward direction 62 on the tilt lever assembly center of mass 112 urges the tilt lever 90 towards the locked position. For example, in the illustrated embodiment, the tilt lever 90 and the tilt lever counterweight 110 are positioned in opposite quadrants about the tilt lever pivot axis 96 with the tilt lever assembly center of mass 112 positioned in the same quadrant as the tilt lever counterweight 110 when viewed from the side like in FIGS. 4 and 5.

It should be appreciated that in the event of a front-end impact (i.e., a crash of the vehicle), the rapid deceleration results in inertial forces 108, 109 acting on the tilt lock mechanism center of mass 106 and the tilt lever assembly center of mass 112 that generally point in the forward direction 62 (i.e., towards the front-end of the vehicle/in the direction of vehicle travel). The way the tilt lock counterweight 104 distributes the overall mass of the tilt lock mechanism 74 about the tilt lock lever pivot axis 82 helps to hold the tilt lock lever 78 in the engaged position throughout the crash. Similarly, the way the tilt lever counterweight 110 distributes the overall mass of the tilt lever assembly 76 about the tilt lever pivot axis 96 helps to hold the tilt lever 90 in the locked position throughout the crash. In other words, during a front-end impact, inertial forces 108, 109 acting in the forward direction 62 on the tilt lever assembly center of mass 112 and the tilt lock lever 78 assembly center of mass push/hold the tilt lever 90 in the locked position and the tilt lock lever 78 in the engaged position to prevent the tilt housing 28 from pivoting relative to the steering column housing 30 during the crash for an improved factor of safety. It should be appreciated that these advantages can be achieved in a design where only the tilt lock lever counterweight 104 is utilized, in a design where only the tilt lever counterweight 110 is utilized, or in a design where both the tilt lock lever counterweight 104 and the tilt lever counterweight 110 are utilized like in FIGS. 2-5. It should also be appreciated that the tilt lock lever counterweight 104 and the tilt lever counterweight 110 may be integrally formed in the tilt lock lever 78 and the tilt lever 90 and need not be separate components that are mounted to the tilt lock lever 78 and the tilt lever 90, respectively. For example, the shape, material thickness, and material composition of portions of the tilt lock lever 78 and the tilt lever 90 may be specifically selected to provide the functionality of the tilt lock lever counterweight 104 and the tilt lever counterweight 110 described herein.

Figure 6:
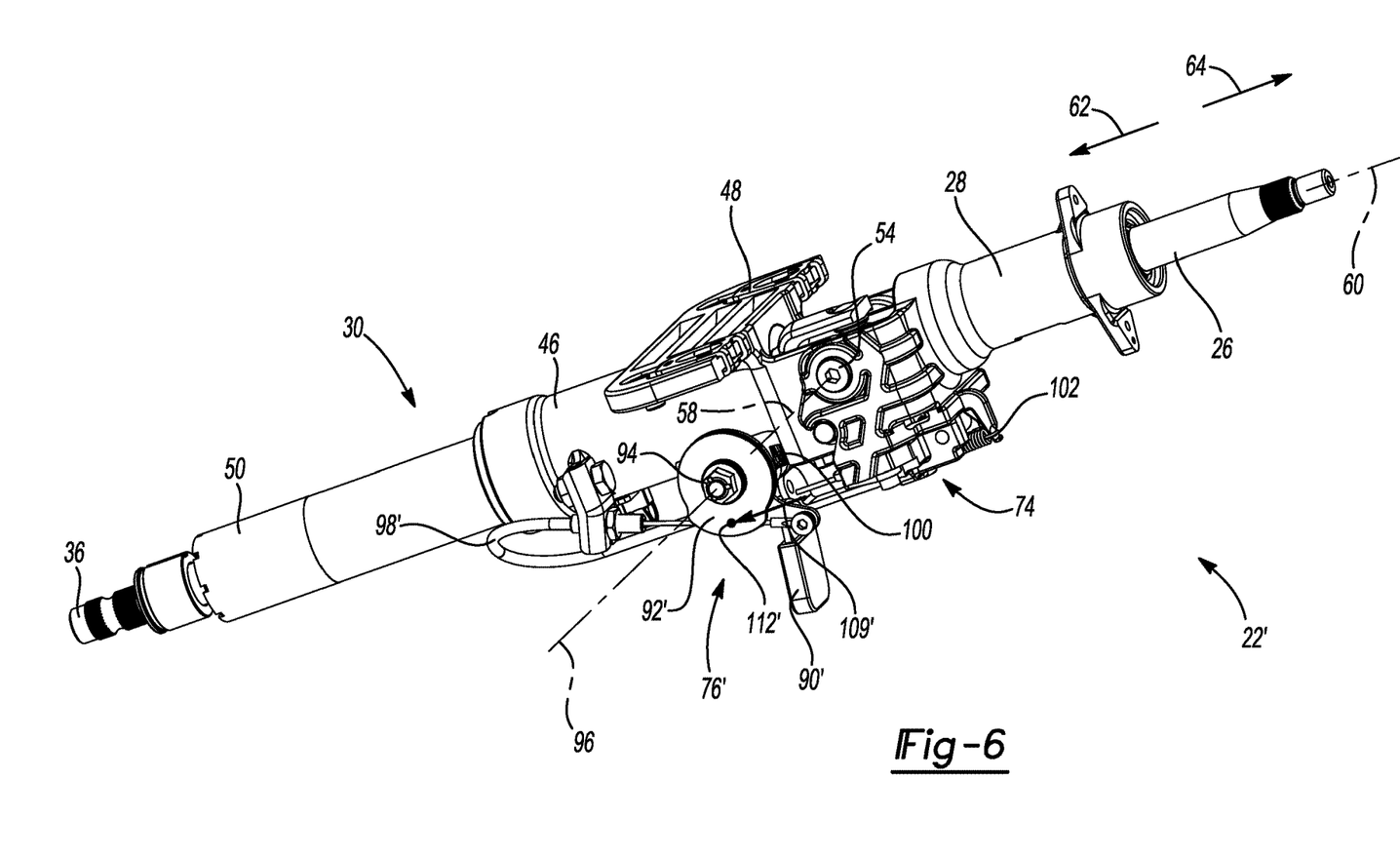
FIG. 6 is a side perspective view of another exemplary steering column assembly, which includes a tilt lever assembly and tilt lock mechanism that are constructed in accordance with the present disclosure.
Figure 7:
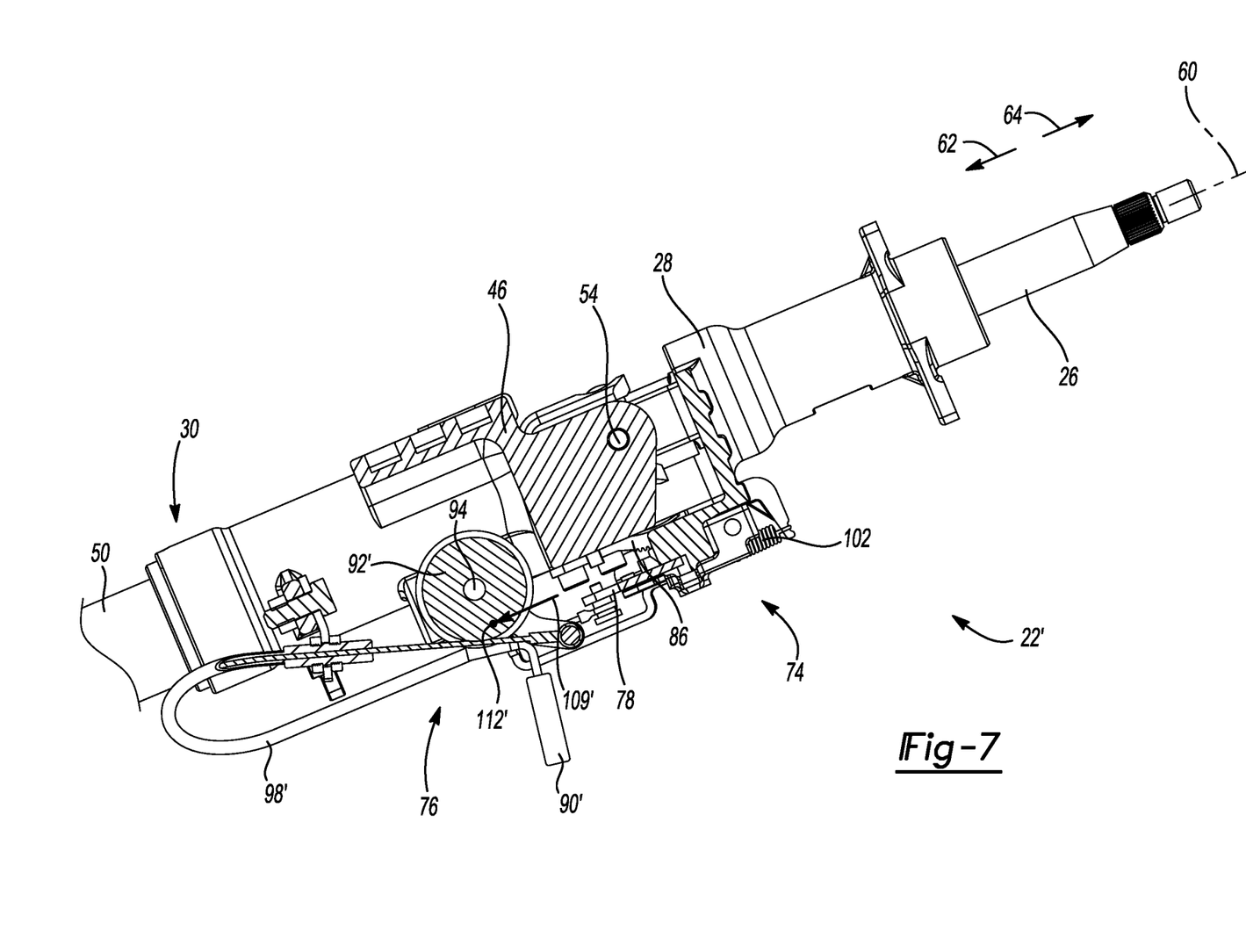
FIG. 7 is a side cross-section view of the exemplary steering column assembly shown in FIG. 6 where the tilt lever assembly is shown in a locked position and the tilt lock mechanism is shown in an engaged position.
Figure 8:
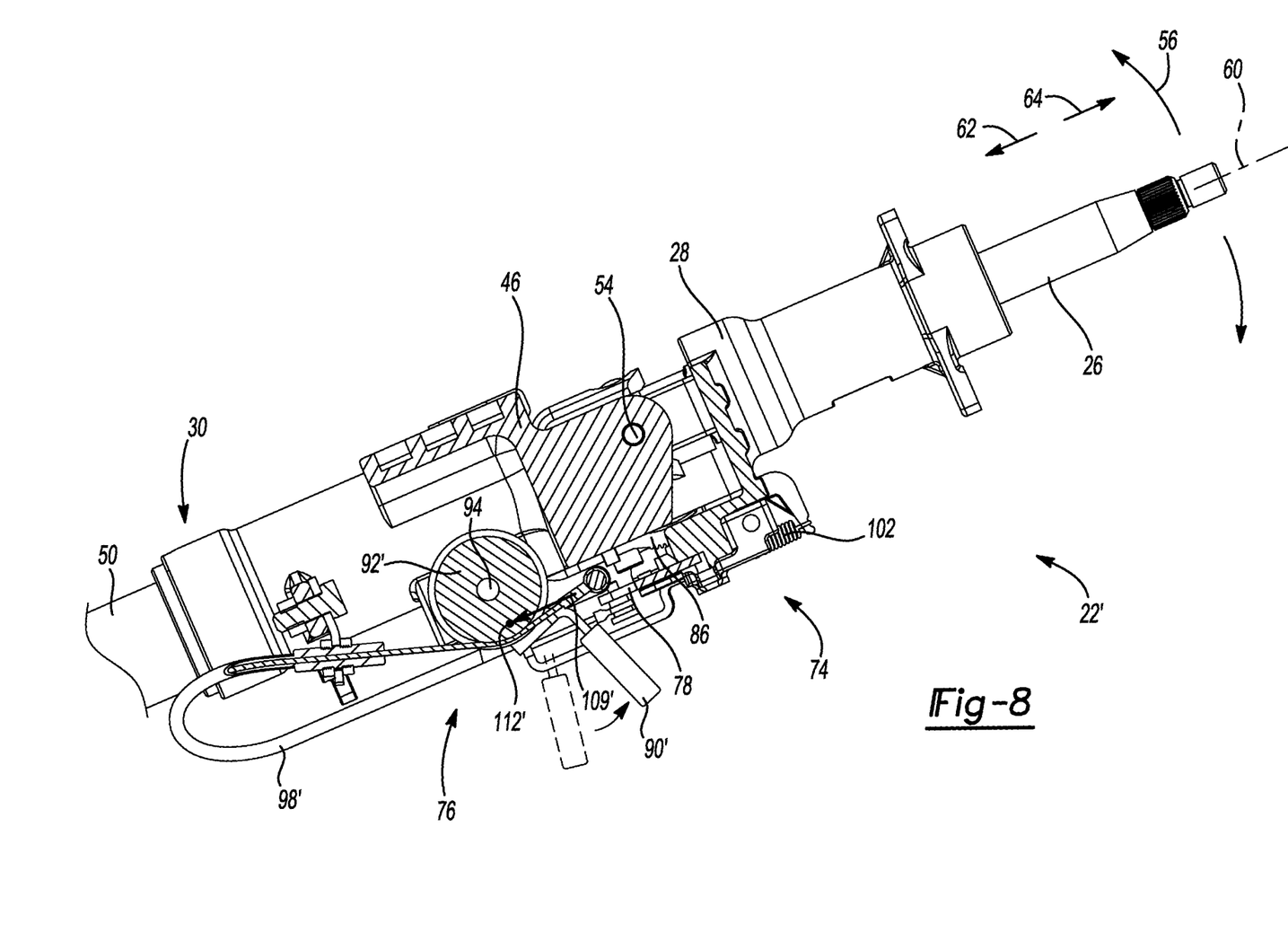
FIG. 8 is a side cross-section view of the exemplary steering column assembly shown in FIG. 6 where the tilt lever assembly is shown in an unlocked position and the tilt lock mechanism is shown in a disengaged position.

FIGS. 6-8 illustrate another exemplary steering column assembly 22', with a tilt lever assembly 76' of an alternative configuration. Many of the elements of the steering column assembly 22' shown in FIGS. 6-8 are the same as the elements of the steering column assembly 22 shown in FIGS. 1-5 and therefore share the same reference numbers. The elements in FIGS. 6-8 that are new, different, or have been modified are labeled with reference numbers where a prime (') annotation has been appended after the reference numeral.

The tilt lever assembly 76' illustrated in FIGS. 6-8 includes a modified tilt lever 90' and pulley 92' that are constructed such that a modified push-pull cable 98' may be wound about a different portion of the pulley 92' relative to the design shown in FIGS. 1-5. In FIGS. 6-8, the push-pull cable 98' is wound about a portion of the pulley 92' in a counter-clockwise direction when viewed from the cable attachment side of the steering column housing 30 as shown in FIGS. 6-8 (i.e., the push-pull cable 98' is wound under the pulley 92') and therefore is arranged such that movement of the tilt lever 90' in the forward direction 62 causes the push-pull cable 98' to push the tilt lock lever 78 to the engaged position, which is the opposite of the tilt lever 90 operation illustrated in FIGS. 1-5.

As shown in FIGS. 7 and 8, the tilt lever 90' is moveable (i.e., rotates or pivots about the tilt lever pivot axis 96) between a locked position (FIG. 7) and an unlocked position (FIG. 8). The tilt lock lever 78 is moveable (i.e., rotates about the tilt lock lever pivot axis 82) between an engaged position (FIG. 7) and a disengaged position (FIG. 8). Like in the design shown in FIGS. 1-5, the tilt lever 90' is mechanically coupled to the tilt lock lever 78 by the push-pull cable 98' such that the tilt lock lever 78 is placed in the engaged position when the tilt lever 90' is in the locked position (FIG. 7) and the tilt lock lever 78 is placed in the disengaged position when the tilt lever 90' is in the unlocked position (FIG. 8); however, the direction of operation of the tilt lever 90' is reversed in the design shown in FIGS. 6-8.

As shown in FIG. 7, movement of the tilt lever 90' in the forward direction 62 to the locked position moves the tilt lock lever 78 to the engaged position and places the tilt lock mechanism 74 in an engaged condition where the tilt lock lever 78 and/or tilt lock slide 84 move into contact with and hold the pawl 88 in engagement with the ratchet 86 preventing the tilt housing 28 from pivoting relative to the steering column housing 30. As shown in FIG. 8, movement of the tilt lever 90' in the rearward direction 64 to the unlocked position moves the tilt lock lever 78 to the disengaged position and places the tilt lock mechanism 74 in a disengaged condition where the tilt lock lever 78 moves away from the pawl 88 releasing it so the tilt housing 28 is permitted to pivot relative to the steering column housing 30 and may be adjusted within the range of angular positions 56 permitted by the steering column assembly 22'. The tilt lever 90' is then moved back in the opposite direction (i.e., the forward direction 62) to lock the tilt lock mechanism 74 in place once a desirable angular position 56 is selected to prevent the steering wheel from tilting or pivoting when the vehicle is being driven.

In this way, by reversing the direction of operation of the tilt lever 90', the design shown in FIGS. 6-8 takes advantage of the natural weight distribution of the tilt lever assembly 76' so that an inertial force 109' acting on the tilt lever assembly 76' will help to hold the tilt lock lever 78 in the engaged position throughout the crash. In this design, the tilt lever assembly 76' has a tilt lever assembly center of mass 112' that is located in the same quadrant as the tilt lever 90' relative to the tilt lever pivot axis 96. Because the direction of operation is reversed, where movement of the tilt lever 90' in the forward direction 62 corresponds to the locked position, the inertial force 109' acting in the forward direction 62 on the tilt lever assembly center of mass 112' pushes/holds the tilt lever 90' in the locked position during the crash for an improved factor of safety.

Many other modifications and variations of the present disclosure are possible in light of the above teachings and may be practiced otherwise than as specifically described while within the scope of the appended claims.

What is claimed is:

1. A steering column assembly comprising:
   a steering column housing;
   a tilt housing pivotally attached to said steering column housing at a tilt housing pivot such that said tilt housing is moveable between a range of angular positions relative to said steering column housing;
   a steering wheel shaft extending in a forward direction toward said steering column housing along a steering wheel shaft axis;
   a tilt lock mechanism that is mechanically actuatable to an engaged condition and to a disengaged condition;
   said tilt lock mechanism being configured to prevent said tilt housing from pivoting relative to said steering column housing in said engaged condition;
   said tilt lock mechanism being configured to permit said tilt housing to pivot relative to said steering column housing over said range of angular positions;
   a tilt lever assembly that includes a tilt lever that is moveable between a locked position and an unlocked position;
   said tilt lever assembly being mechanically coupled to said tilt lock mechanism such that said tilt lever assembly mechanically actuates said tilt lock mechanism to place said tilt lock mechanism in said engaged condition when said tilt lever is in said locked position and mechanically actuates said tilt lock mechanism to place said tilt lock mechanism in said disengaged condition when said tilt lever is in said unlocked position; and
   said tilt lever assembly having a tilt lever assembly center of mass that is positioned such that an inertial force acting in said forward direction on said tilt lever assembly center of mass urges said tilt lever towards said locked position.

2. The steering column assembly as set forth in claim 1 wherein said tilt lever is mounted on a tilt lever pivot such that said tilt lever is permitted to rotate about a tilt lever pivot axis that is co-axially aligned with said tilt lever pivot.

3. The steering column assembly as set forth in claim 2 wherein said tilt lock mechanism includes a tilt lock lever that is mounted on a tilt lock lever pivot such that said tilt lock lever is permitted to rotate about a tilt lock lever pivot axis that is co-axially aligned with said tilt lock lever pivot.

4. The steering column assembly as set forth in claim 3 wherein said tilt lock mechanism includes a ratchet on said steering column housing and a pawl pivotally mounted to said tilt housing and positioned to selectively engage said ratchet.

5. The steering column assembly as set forth in claim 4 wherein said tilt lock lever is rotatable about said tilt lock lever pivot axis between an engaged position and a disengaged position, wherein said tilt lock lever is arranged to contact and hold said pawl in engagement with said ratchet in said engaged position to place said tilt lock lever in said engaged condition, and wherein said tilt lock lever is arranged to move away from said pawl in said disengaged position to place said tilt lock lever in said disengaged condition.

6. The steering column assembly as set forth in claim 5 wherein said tilt lever is mechanically coupled to said tilt lock lever such that said tilt lock lever is placed in said engaged position when said tilt lever is in said locked position and said tilt lock lever is placed in said disengaged position when said tilt lever is in said unlocked position.

7. The steering column assembly as set forth in claim 6 wherein said tilt lever is mechanically coupled to said tilt lock lever by a push-pull cable.

8. The steering column assembly as set forth in claim 7 wherein said tilt lever assembly includes a pulley that rotates with said tilt lever about said tilt lever pivot axis, said push-pull cable being wound about at least a portion of said pulley and arranged such that movement of said tilt lever in said forward direction causes said push-pull cable to pull said tilt lock lever out to said disengaged position.

9. The steering column assembly as set forth in claim 7 wherein said tilt lever assembly includes a pulley that rotates with said tilt lever about said tilt lever pivot axis, said push-pull cable being wound about at least a portion of said pulley and arranged such that movement of said tilt lever in said forward direction causes said push-pull cable to push said tilt lock lever to said engaged position.

10. The steering column assembly as set forth in claim 6 wherein said tilt lock mechanism includes a tilt lock mechanism center of mass that is positioned such that an inertial force acting in said forward direction on said tilt lock mechanism center of mass urges said tilt lock lever towards said engaged position.

11. The steering column assembly as set forth in claim 10 wherein said tilt lock mechanism includes a tilt lock lever counterweight that is rotatably coupled to said tilt lock lever such that said tilt lock lever counterweight rotates with said tilt lock lever about said tilt lock lever pivot axis and places said tilt lock mechanism center of mass at a position where said inertial force urges said tilt lock lever towards said engaged position.

12. The steering column assembly as set forth in claim 3 wherein said tilt lever pivot axis is spaced from and transverse to said tilt lock lever pivot axis.

13. The steering column assembly as set forth in claim 2 wherein said tilt lever assembly includes a tilt lever counterweight that is rotatably coupled to said tilt lever such that said tilt lever counterweight rotates with said tilt lever about said tilt lever pivot axis and places said tilt lever assembly center of mass at a position where said inertial force urges said tilt lever towards said locked position.

14. The steering column assembly as set forth in claim 13 wherein said tilt lever and said tilt lever counterweight are positioned in opposite quadrants about said tilt lever pivot axis with said tilt lever assembly center of mass positioned in the same quadrant as said tilt lever counterweight.

15. The steering column assembly as set forth in claim 1 wherein said steering wheel shaft is rotatably supported by said tilt housing such that said steering wheel shaft is rotatable about said steering wheel shaft axis.

16. The steering column assembly as set forth in claim 15, further comprising:
a first intermediate shaft extending along a first intermediate shaft axis, said first intermediate shaft being rotatably supported by said steering column housing such that first intermediate shaft is rotatable about said first intermediate shaft axis; and
a first coupling that maintains a rotatable coupling between said steering wheel shaft and said first intermediate shaft while permitting said steering wheel shaft axis and said first intermediate shaft axis to be arranged in accordance with said range of angular positions.

17. A steering column assembly comprising:
a steering column housing;
a tilt housing pivotally attached to said steering column at a tilt housing pivot such that said tilt housing is moveable between a range of angular positions relative to said steering column housing;
a steering wheel shaft extending in forward direction toward said steering column housing along a steering wheel shaft axis;
a tilt lock mechanism including a tilt lock lever that is mounted on a tilt lock lever pivot such that said tilt lock lever is permitted to rotate about a tilt lock lever pivot axis that is co-axially aligned with said tilt lock lever pivot, a ratchet on said steering column housing, and a pawl that is pivotally mounted to said tilt housing and positioned to selectively engage said ratchet;
said tilt lock lever is rotatable about said tilt lock lever pivot axis between an engaged position and a disengaged position where said tilt lock lever is arranged to contact and hold said pawl in engagement with said ratchet when said tilt lock lever is in said engaged position and prevent said tilt housing from pivoting relative to said steering column housing and where said tilt lock lever is arranged to move away from said pawl when said tilt lock lever is in said disengaged position and permit said tilt housing to pivot relative to said steering column housing over said range of angular positions;
a tilt lever assembly that includes a tilt lever that is rotatable about a tilt lever pivot axis between a locked position and an unlocked position and that is mechanically coupled to said tilt lock lever such that said tilt lock lever is placed in said engaged position when said tilt lever is in said locked position and said tilt lock lever is placed in said disengaged position when said tilt lever is in said unlocked position; and
said tilt lock mechanism including a tilt lock lever counterweight that is rotatably coupled to said tilt lock lever such that said tilt lock lever counterweight rotates with said tilt lock lever about said tilt lock lever pivot axis and provides a tilt lock mechanism center of mass at a position where an inertial force acting in said forward direction on said tilt lock mechanism center of mass urges said tilt lock lever towards said engaged position.

18. The steering column assembly as set forth in claim 17 wherein said tilt lever assembly includes a tilt lever counterweight that is rotatably coupled to said tilt lever such that said tilt lever counterweight rotates with said tilt lever about said tilt lever pivot axis and provides a tilt lever assembly center of mass at a position where an inertial force acting in said forward direction on said tilt lever assembly center of mass urges said tilt lever towards said locked position.

19. A steering column assembly comprising:
a steering column housing;
a tilt housing pivotally attached to said steering column at a tilt housing pivot such that said tilt housing is moveable between a range of angular positions relative to said steering column housing;
a steering wheel shaft extending in forward direction toward said steering column housing along a steering wheel shaft axis;
a tilt lock mechanism including a tilt lock lever that is mounted on a tilt lock lever pivot such that said tilt lock lever is permitted to rotate about a tilt lock lever pivot axis that is co-axially aligned with said tilt lock lever pivot, a ratchet on said steering column housing, and a pawl that is pivotally mounted to said tilt housing and positioned to selectively engage said ratchet;
said tilt lock lever is rotatable about said tilt lock lever pivot axis between an engaged position and a disengaged position where said tilt lock lever is arranged to contact and hold said pawl in engagement with said ratchet when said tilt lock lever is in said engaged position and prevent said tilt housing from pivoting relative to said steering column housing and where said tilt lock lever is arranged to move away from said pawl when said tilt lock lever is in said disengaged position and permit said tilt housing to pivot relative to said steering column housing over said range of angular positions;
a tilt lever assembly that includes a tilt lever that is rotatable about a tilt lever pivot axis between a locked position and an unlocked position and that is mechanically coupled to said tilt lock lever by a push-pull cable such that said tilt lock lever is placed in said engaged position when said tilt lever is in said locked position and said tilt lock lever is placed in said disengaged position when said tilt lever is in said unlocked position; and
said tilt lever assembly including a pulley that rotates with said tilt lever about said tilt lever pivot axis, said push-pull cable being wound about at least a portion of said pulley and arranged such that movement of said tilt lever in said forward direction causes said push-pull cable to push said tilt lock lever to said engaged position, the steering column assembly further comprising a tilt lever biasing member that is connected to and biases said tilt lever toward said locked position; and a tilt lock biasing member that biases said tilt lock lever toward said engaged position.

\* \* \* \* \*